United States Patent
Tzirkel-Hancock et al.

(10) Patent No.: US 9,747,917 B2
(45) Date of Patent: Aug. 29, 2017

(54) POSITION DIRECTED ACOUSTIC ARRAY AND BEAMFORMING METHODS

(71) Applicant: GM GLOBAL TECHNOLOGY OPERATIONS LLC, Detroit, MI (US)

(72) Inventors: Eli Tzirkel-Hancock, Ra'Anana (IL); Igal Bilik, Rehovot (IL); Moshe Laifenfeld, Haifa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 277 days.

(21) Appl. No.: 13/918,752

(22) Filed: Jun. 14, 2013

(65) Prior Publication Data

US 2014/0372129 A1    Dec. 18, 2014

(51) Int. Cl.
*G10L 21/00* (2013.01)
*G10L 15/00* (2013.01)
*G10L 21/0208* (2013.01)
*H04R 3/00* (2006.01)
*G01S 13/06* (2006.01)
(Continued)

(52) U.S. Cl.
CPC ............. *G10L 21/00* (2013.01); *G01S 13/06* (2013.01); *G01S 15/06* (2013.01); *G10L 15/00* (2013.01); *H04R 3/005* (2013.01); *G10L 21/0208* (2013.01); *G10L 2021/02166* (2013.01); *H04R 2201/401* (2013.01); *H04R 2201/405* (2013.01); *H04R 2430/25* (2013.01)

(58) Field of Classification Search
CPC  G10L 2021/02166; G10L 15/25; G10L 15/00
USPC ........................ 704/226, 233, 278
See application file for complete search history.

(56) References Cited

U.S. PATENT DOCUMENTS

| | | | |
|---|---|---|---|
| 5,008,946 A | * | 4/1991 | Ando ............... B60H 1/00757 180/167 |
| 5,574,824 A | * | 11/1996 | Slyh .................. G10L 21/0208 704/220 |
| 6,529,809 B1 | | 3/2003 | Breed et al. |

(Continued)

FOREIGN PATENT DOCUMENTS

| CN | 101034158 A | 9/2007 |
|---|---|---|
| CN | 101064975 A | 10/2007 |

OTHER PUBLICATIONS

State Intellectual Property Office of the People's Republic of China, Office Action in Chinese Patent Application No. 201310747323.2 mailed Mar. 3, 2017.

(Continued)

*Primary Examiner* — Huyen Vo
*Assistant Examiner* — Rodrigo Chavez
(74) *Attorney, Agent, or Firm* — Lorenz & Kopf, LLP

(57) ABSTRACT

Methods and systems are provided for receiving desired sounds. The system includes a position sensor configured to determine an occupant position of an occupant engaging in speech within a defined space and transmit the speaking occupant position. A plurality of microphones are configured to receive sound from within the defined space and transmit audio signals corresponding to the received sound. A processor, in communication with the position sensor and the microphones, is configured to receive the speaking occupant position and the audio signals, apply a beamformer to the audio signals to direct a microphone beam toward the occupant position, and generate a beamformer output signal.

16 Claims, 5 Drawing Sheets

(51) Int. Cl.
  *G01S 15/06* (2006.01)
  *G10L 21/0216* (2013.01)

(56) References Cited

U.S. PATENT DOCUMENTS

| | | | |
|---|---|---|---|
| 7,421,321 B2 | 9/2008 | Breed et al. | |
| 8,233,642 B2* | 7/2012 | Mao | G10L 21/0208 381/122 |
| 2003/0036835 A1* | 2/2003 | Breed | G01S 15/04 701/45 |
| 2006/0222184 A1* | 10/2006 | Buck | G10L 21/0208 381/71.1 |
| 2007/0165866 A1 | 7/2007 | Super | |
| 2007/0273585 A1* | 11/2007 | Sarroukh | G10K 11/341 342/379 |
| 2010/0169089 A1* | 7/2010 | Iwasawa | G10L 21/028 704/233 |
| 2010/0217590 A1* | 8/2010 | Nemer | G01S 3/8006 704/233 |
| 2011/0129101 A1 | 6/2011 | Hooley | |
| 2012/0114138 A1 | 5/2012 | Hyun | |
| 2013/0223660 A1* | 8/2013 | Olafsson | H04R 25/407 381/313 |

OTHER PUBLICATIONS

Neo, W.H., et al., "Robust Microphone Arrays Using Subband Adaptive Filters", IEE Proceedings—Vision, Image and Signal Processing, Feb. 2002, p. 17-25, vol. 149, issue 1.

Hoshuyama, O., et al., "A Robust Adaptive Beamformer with a Blocking Matrix Using Coefficient-Constrained Adaptive Filters", IEICE Trans. Fundamentals, Apr. 1999, pp. 640-647, vol. E82-A, No. 4.

CTSR. Edinburgh Speech Science and Technology [online]. Centre for Speech Technology Research, 2 Buccleuch Place, Edinburgh, [retrieved on Oct. 1, 2012]. Retrieved from Internet: <URL: http://www.ctsr.ed.ac.uk/edsst/research.html>.

\* cited by examiner

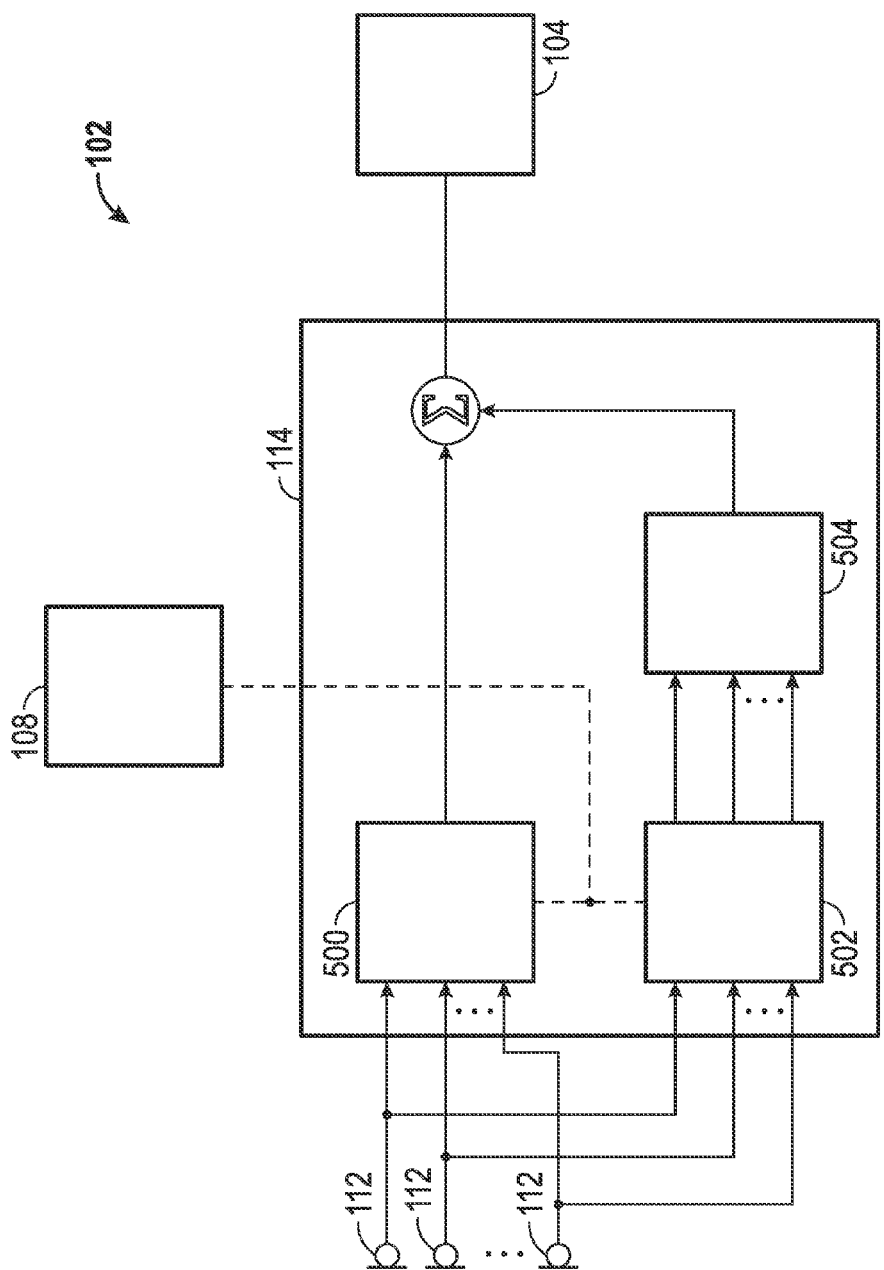

POSITION DIRECTED ACOUSTIC ARRAY AND BEAMFORMING METHODS

TECHNICAL FIELD

The technical field generally relates to acoustic arrays and beamforming methods, and more particularly relates to beamforming systems and methods to enhance speech with an acoustic array.

BACKGROUND

Modern vehicles, such as automobiles, often utilize speech recognition processes to accept audible input and commands from a driver or other occupants. For instance, a person may use audible commands to select entertainment options or participate in a mobile telephone conversation.

Speech recognition performance in vehicles may be adversely affected by noise or other disturbances. For instance, engine noise, road noise, wind noise, and/or entertainment devices may produce noise that interfere with the capability of a speech recognition system to properly interpret the audible input and commands of the speaker. While some techniques have been attempted in the prior art to reduce such disturbances, they are typically not robust enough to adapt to rapid changes in acoustic conditions, e.g., the noises that commonly occur in automobiles.

Accordingly, it is desirable to provide systems and techniques to limit the effects of undesired noise and disturbances in an audio signal. Furthermore, other desirable features and characteristics of the present invention will become apparent from the subsequent detailed description and the appended claims, taken in conjunction with the accompanying drawings and the foregoing technical field and background.

SUMMARY

An adaptive beamforming method for receiving desired sounds is provided. In one embodiment, the method includes determining an occupant position of an occupant engaging in speech within a defined space. The method also includes receiving sound from within the defined space with a plurality of microphones. A plurality of audio signals corresponding to the received sound at each of the plurality of microphones are generated. The method also includes applying a beamformer to the audio signals to direct a microphone beam toward the determined occupant position and generate a beamformer output signal.

A system is provided for receiving desired sounds. In one embodiment, the system includes a position sensor configured to determine an occupant position of an occupant engaging in speech within a defined space and transmit the speaking occupant position. A plurality of microphones are configured to receive sound from within the defined space and transmit audio signals corresponding to the received sound. The system further includes a processor in communication with the position sensor and the microphones. The processor is configured to receive the speaking occupant position and the audio signals, apply a beamformer to the audio signals to direct a microphone beam toward the occupant position, and generate a beamformer output signal.

DESCRIPTION OF THE DRAWINGS

The exemplary embodiments will hereinafter be described in conjunction with the following drawing figures, wherein like numerals denote like elements, and wherein:

FIG. 5 is a block diagram of a processor of the audio system in accordance with an exemplary embodiment.

DETAILED DESCRIPTION

Figure 1:
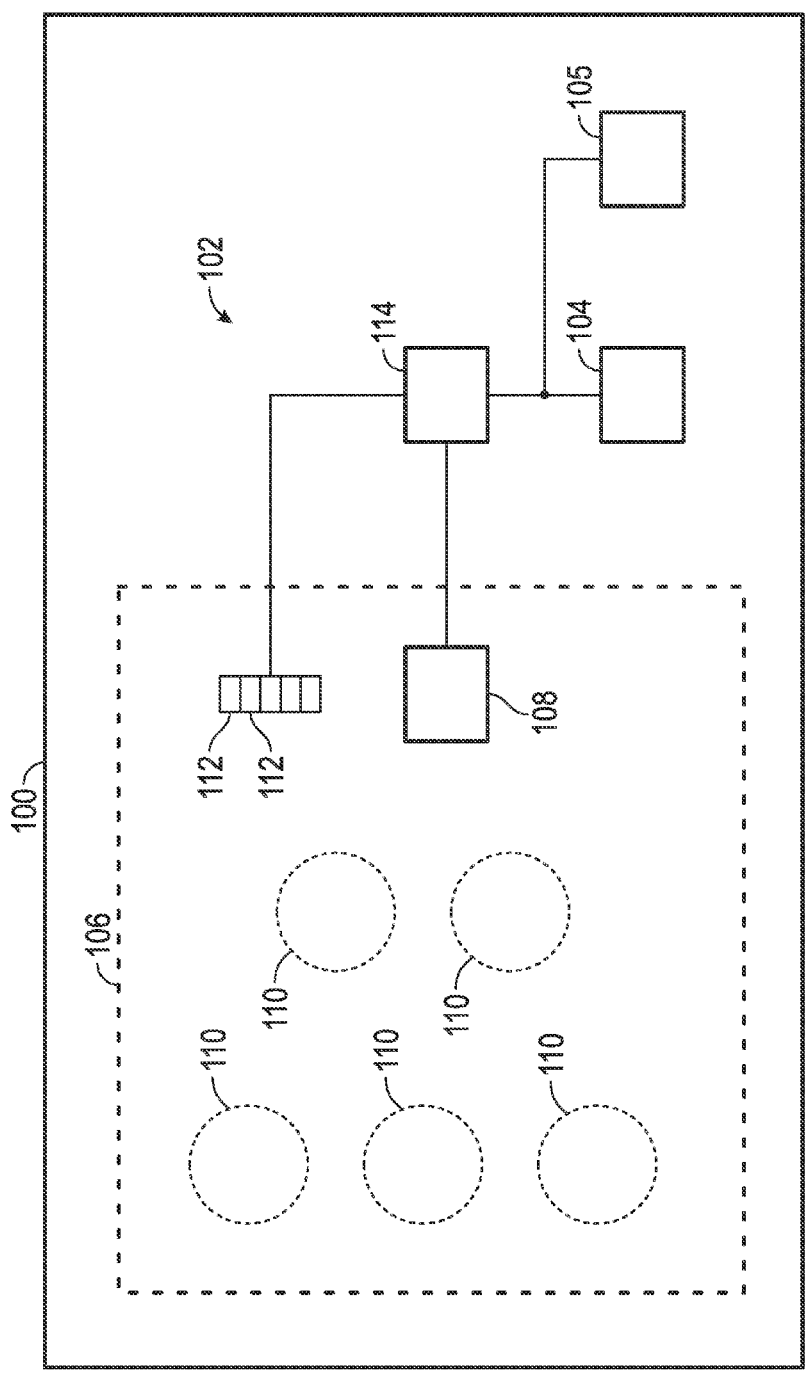
FIG. 1 is a block diagram of a vehicle including an audio system in accordance with an exemplary embodiment.

The following detailed description is merely exemplary in nature and is not intended to limit the application and uses. Furthermore, there is no intention to be bound by any expressed or implied theory presented in the preceding technical field, background, brief summary or the following detailed description.

Referring to the figures, wherein like numerals indicate like parts throughout the several views, a vehicle 100 having an audio system 102 for receiving desired sounds is shown herein. In the exemplary embodiments shown herein, the vehicle 100 is an automobile (not separately numbered) and the audio system 102 is coupled to a speech recognition system 104 for determining the words that are being spoken. However, the audio system 102 and/or the speech recognition system 104 described herein may be implemented and/or utilized in other types of vehicles 100 or in non-vehicle applications. For instance, other vehicles 100 may include, but are not limited to, aircraft (not shown). Non-vehicle applications include, but are not limited to, offices in a factory environment (not shown). Furthermore, instead of, or in addition to, the speech recognition system 104, the audio system 102 may be coupled to a telephony system 105. The telephony system 105 may be utilized to perform telecommunications with, e.g., a cellular telephone network (not shown). Those skilled in the art will appreciate other systems that may be coupled to the audio system 102.

With reference to FIG. 1, the vehicle 100 of the exemplary embodiments defines a defined space 106. Specifically, in the exemplary embodiments, the defined space 106 is a passenger compartment (not separately numbered) of the vehicle 100. The passenger compartment accommodates one or more individuals, i.e., occupants of the vehicle 100, e.g., a driver and passenger(s).

The audio system 102 includes a position sensor 108. The position sensor 108 is configured to determine an occupant position of an occupant 110 within the defined space 106. In the exemplary embodiments, the position sensor 108 is configured to determine the position of each occupant 110. That is, the position sensor 108 is configured to determine a plurality of occupant positions of a plurality of occupants 110. Accordingly, the position sensor 108 may also determine the number of occupants 110. For instance, the position sensor 108 may be utilized to determine the position of any of a plurality of occupants 110. However, the position sensor 108 may be configured to only determine the position of one occupant 110, for example, a driver (not separately numbered) of the vehicle 100. For readability, the description hereafter may refer to a single occupant 110. However, this should not be in any way read as limiting, as the position sensor 108 of the exemplary embodiments may be configured to sense a position of a plurality of occupants 110.

The position sensor 108 may be configured to repeatedly and/or continuously determine the position of the occupant (s) 110 at any time the audio system 102 is in operation. As such, the position of each occupant 110 may be updated as the occupant 110 changes position within the defined space 106.

More specifically, the position sensor 108 is configured to sense the position of the head of the occupant 110. Even more specifically, the position sensor 108 is configured to sense the position of the mouth of the occupant 110. As such, the occupant position, as used hereafter, may be considered as the position of the mouth of the occupant 110 of the vehicle 100.

Furthermore, and as described in greater detail below, the position sensor 108 of at least one of the exemplary embodiments described below, is also configured to determine which of the occupants 110 is engaging in speech. Said another way, the position sensor 108 may be configured to determine which occupant 110 is talking. Said yet another way, the position sensor 108 may be configured to determine if the lips/mouth of each occupant 110 is moving.

In a first exemplary embodiment, the position sensor 108 utilizes sound waves in an ultrasonic range to determine the position of the occupant 110 of the vehicle 100. As such, sound waves in this range are outside that of typical human hearing and therefore will not distract the occupants and should not pose privacy concerns. Accordingly, the position sensor 108 may be referred to as an ultrasonic position sensor (not separately numbered).

Figure 2:
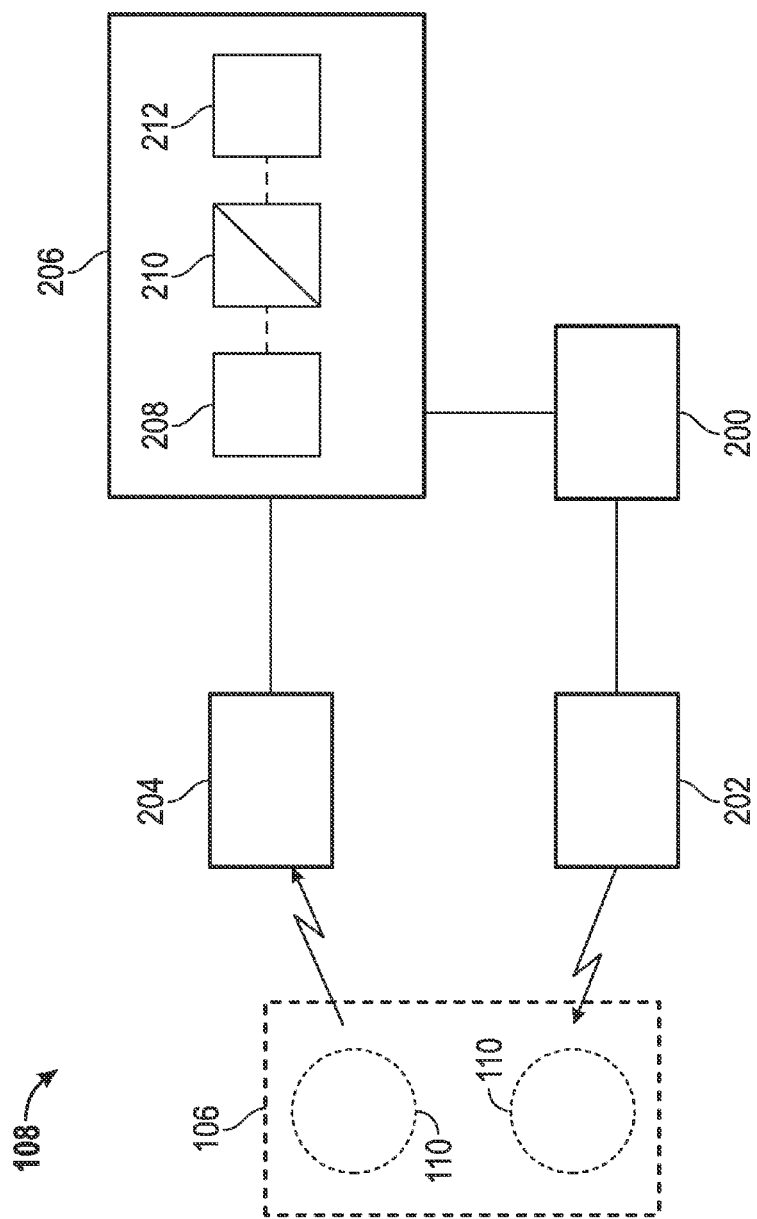
FIG. 2 is block diagram of a position sensor of the audio system in accordance with a first exemplary embodiment.

Referring now to FIG. 2, the position sensor 108 of the first exemplary embodiment includes a signal generator 200. The signal generator 200 may be configured to generate a high-voltage continuous wave ("CW") signal and/or a plurality of high-voltage pulses. Other types of signals may alternatively be generated by the signal generator 200 as appreciated by those skilled in the art. A plurality of ultrasonic transmitters 202 are electrically coupled to the signal generator 200. The ultrasonic transmitters 202, commonly referred to as transmitting transducers, generate sound waves in the ultrasonic range. The sound waves generated by the ultrasonic transmitters 202 correspond to the signal generated by the signal generator 200, and may be beamformed to propagate in a specific direction or be omnidirectional. Specifically, in the first exemplary embodiment, the sound waves have a center frequency of about 100 kilohertz ("kHz") and an effective bandwidth of about 25 kHz. Of course, other suitable frequencies for the sound waves in the ultrasonic range will be realized by those skilled in the art.

The sound waves reflect off of objects disposed in the defined space 106 including the occupant 110. The position sensor 108 of the exemplary embodiments further includes a plurality of ultrasonic receivers 204 for receiving these reflected sound waves. Specifically, in the exemplary embodiments, about 16 ultrasonic receivers 204 are utilized to receive the reflected sound waves; however, a different number of ultrasonic receivers 204 could be employed. The ultrasonic receivers 204, commonly referred to as transducer receivers, generate a plurality of received signals corresponding to the received reflected sound waves.

Although the above description of the ultrasonic transmitters 202 and receivers 204 may imply separate devices, the ultrasonic transmitters 202 and receivers 204 may be combined into one or more transceivers (not shown) as appreciated by those skilled in the art.

With continued reference to FIG. 2, the position sensor 108 also includes a processing unit 206 in communication with the ultrasonic receivers 204. The processing unit 206 receives the received signals from the ultrasonic receivers 204 and is configured to determine the position of the occupant 110 of the vehicle 100 as well as the number of occupants 110. More specifically, in the first exemplary embodiment, the processing unit 206 is configured to determine the position of the mouth of the occupants 110 of the vehicle 100.

The processing unit 206 may be configured to condition, filter, demodulate, and/or sample the reflected signals received by the ultrasonic receivers 204 to generate a processed signal. Specifically, the processing unit 206 of the first exemplary embodiment includes conditioning circuitry 208 coupled to the ultrasonic receivers 204, an analog-to-digital converter ("ADC") 210 coupled to the conditioning circuitry 208, and a microprocessor 212 coupled to the ADC 210. However, the specific design parameters of the processing unit 206 may vary as is realized by those skilled in the art.

The microprocessor 212 may also be utilized to identify motion of the mouth of the occupant 110, which may indicate that the occupant 110 is engaging in speech. That is, the microprocessor 212 is configured to determine that an occupant 110 is engaging in speed and the position of that occupant 110. Specifically, the processed signal may be further processed to search for spatio-temporal and velocity (Doppler based) distinguishing features that indicate mouth movement, and thus, an indication that the occupant 110 is speaking. For example, a lip movement of 10 cm/second may generate a Doppler shift of approximately 300 Hz for ultrasonic wave centered at 100 Khz. These relatively high speeds compared to head movements can indicate speech activity.

The processing unit 206 may also be in communication with the signal generator 206. More specifically, the microprocessor 212 may be in communication with the signal generator 206 to control operation of the signal generator 206. Even more specifically, the signal generator 206 may be controlled to perform a scan of the positioning sensor field of view, time the pulsating transmission, and synchronize the transmission to the receivers 204.

In a second exemplary embodiment, the position sensor 108 utilizes radio frequency ("RF") waves in an RF range to determine the position of the occupant 110 of the vehicle 100. Said another way, the position sensor 108 may utilize radar for determining the position of the occupant 110. Such RF waves are not visible or audible and therefore will not distract the occupants and should not pose privacy concerns. Accordingly, the position sensor 108 may be referred to as an RF position sensor (not separately numbered) or a radar position sensor.

Figure 3:
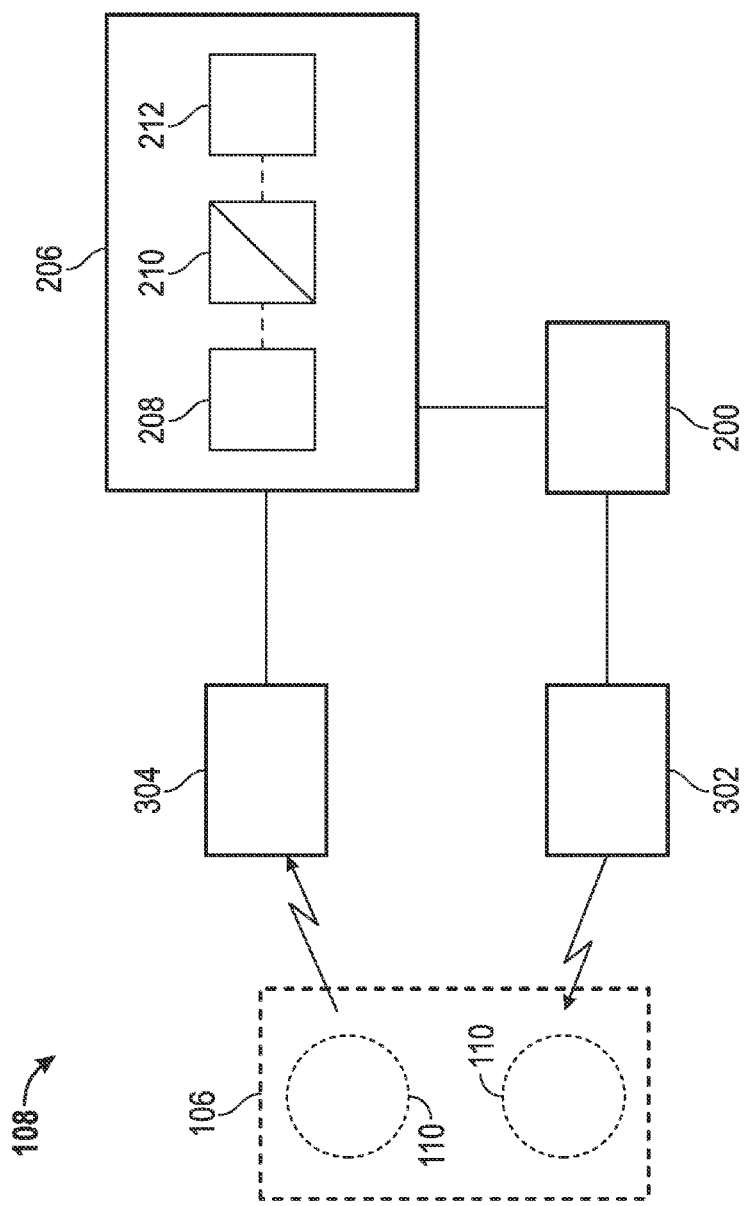
FIG. 3 is block diagram of the position sensor of the audio system in accordance with a second exemplary embodiment.

Referring now to FIG. 3, the position sensor 108 of the second exemplary embodiment includes the signal generator 200. A plurality of RF transmitters 302 are electrically coupled to the signal generator 200. The RF transmitters 302, commonly referred to as transmitters, generate the RF waves. The RF waves generated by the RF transmitters 302 correspond to the signal generated by the signal generator 200. The position sensor 108 of the second exemplary embodiment may utilize a linear frequency modulated ("LFM") CW signal or an ultra-wideband ("UWB") pulse signal. Such signals, having a bandwidth of about 4 Gigahertz ("GHz") at a transmission power on the order of milliwatts ("mW"), would be capable of achieving a resolution of about 4 centimeters ("cm"). Of course, other suitable configurations will be realized by those skilled in the art.

The RF waves reflect off of objects disposed in the defined space 106 including the occupant 110. The position sensor 108 of the second exemplary embodiment further includes a plurality of RF receivers 304 for receiving these reflected RF waves. The RF receivers 304, commonly referred to as transducer receivers, generate a plurality of received signals corresponding to the received reflected RF waves.

Although the above description of the RF transmitters 302 and receivers 304 may imply separate devices, the RF transmitters 302 and receivers 304 may be combined into one or more transceivers (not shown) as appreciated by those skilled in the art.

With continued reference to FIG. 3, the position sensor 108 also includes the processing unit 206 electrically coupled to the RF receivers 304. The processing unit 206 receives the received signals from the ultrasonic receivers 204 and is configured to determine the position of the occupant 110 of the vehicle 100 as well as the number of occupants 110. More specifically, in the second exemplary embodiment, the processing unit 206 is configured to determine the position of the mouth of the occupants 110. The processing unit 206 of the illustrated embodiment includes the conditioning circuitry 208 coupled to the RF receivers 204, the ADC 210 coupled to the conditioning circuitry 208, and the microprocessor 212 coupled to the ADC 210. However, the specific design parameters of the processing unit 206 may vary as is realized by those skilled in the art.

As with the first exemplary embodiments, the processing unit 206 of the second exemplary embodiment may also be in communication with the signal generator 206. More specifically, the microprocessor 212 may be in communication with the signal generator 206 to control operation of the signal generator 206. Even more specifically, the signal generator 206 may be controlled to perform a scan of the positioning sensor field of view, time the pulsating transmission, and synchronize the transmission to the receivers 304.

In another exemplary embodiment (not shown), the position sensor 108 utilizes infrared waves to determine the position of the occupant of the vehicle. For example, the position sensor 108 may include a camera (not shown) with an infrared light source (not shown).

Figure 4:
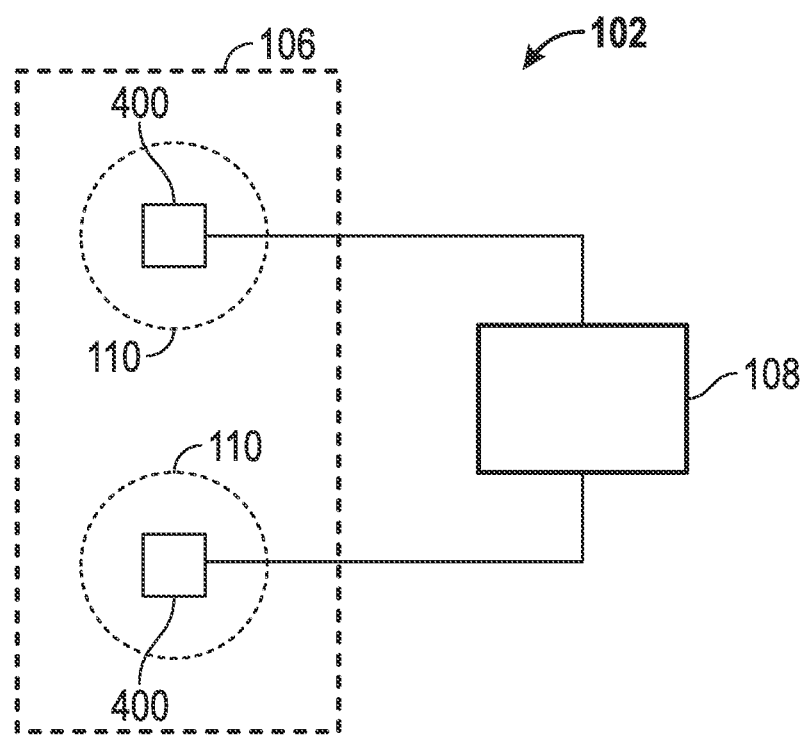
FIG. 4 is block diagram of the position sensor of the audio system in accordance with a third exemplary embodiment.

In a third exemplary embodiment, as shown in FIG. 4, the position sensor 108 may include one or more seat sensors 400. The seat sensor(s) 400 may be disposed in seats (not shown) of the vehicle 100 to detect the presence of the occupant 110. In the third exemplary embodiment, the seat sensors 400 may measure pressure changes that occur when an occupant 110 sits down in one of the seats. However, other techniques for implementing the seat sensors 400 may be realized by those skilled in the art.

The seat sensor(s) 400 may also be used in concert with the ultrasonic, radar, or camera configurations described above. As such, the seat sensor(s) 400 may be utilized in areas of the vehicle 100 that are obscured from the radar or camera configurations or to provide verification of the positions generated by the radar or camera configurations. Furthermore, the audio system 102 of this third exemplary embodiment may also utilize anthropometric data in concert with the seat sensors 400 to determine head and/or mouth position of the occupant 110. For example, the system 102 may have access to height information of the occupant 110, particularly the driver. With that height information, combined with the pressure sensor data indicating the presence of the occupant 110 and/or seat position data, the system 102 of this embodiment is configured to calculate the position of the mouth the occupant 110.

The processing unit 206 of the exemplary embodiments is further configured to transmit various data, including, but not limited to, the number of occupants in the defined space, the positions of the occupants (i.e., the occupant positions), and which of the occupants is speaking Referring again to FIG. 1, the audio system 100 further includes a plurality of microphones 112. Each microphone 112 is configured to receive sound from within the defined space. The microphones may be positioned adjacent one another in a geometric fashion, e.g., in a microphone array. However, in other embodiments (not shown), the microphones 112 may be non-geometrically distributed.

The audio system 100 also includes a processor 114. The processor 114 may comprise a microprocessor, microcontroller, application specific integrated circuit, and/or other suitable device able to perform calculations and/or execute programs or other instructions. The processor 114 is in communication with the position sensor 108 and the microphones 112. As such, the processor 114 is configured to receive the occupant position and other data from the position sensor 108 as well as the audio signals from the microphones 112.

Referring now to FIG. 5, the processor 114 is configured to apply a beamformer 500 to the audio signals received from the microphones 112. As is appreciated by those skilled in the art, beamforming is a spatial signal filtering technique which can control the directionality of signals by modifying the phase and amplitude of the received signals at each microphone 112 of the array. The beamformer 500 of the exemplary embodiment is implemented as software in the processor 114 and is not a separate hardware component. The beamformer 500 generates a beamformer output signal.

Specifically, the beamformer 500 of the audio system 100 directs a microphone beam toward the occupant position. That is, the processor 114 utilizes the occupant position data in the beamforming processes. More specifically, the processor 114 of the exemplary embodiments utilizes the speaking occupant position data, i.e., the location of the mouth of the occupant that is speaking, in directing the microphone beam. In the exemplary embodiments, the beamformer 500 is a fixed beamformer that forms the beam solely on the position data provided by the position sensor 108. Of course, the position data may be updated continuously as described above. As such, the beamformer may change the direction of the microphone beam as the mouth of the speaking occupant moves. Furthermore, in other embodiments, the beamformer 500 may be an adaptive beamformer that directs the microphone beam based not only on the position data, but also the audio signals themselves. Said simply, the adaptive beamformer 500 is used to enhance the received speech signal from the desired direction and to mitigate or minimize noises and interferences, i.e., unwanted signals, from other directions.

The processor 114 of the exemplary embodiments is also configured to apply a blocking matrix 502 to each of the audio signals. The blocking matrix 502 is a spatial rejection filter which excludes a target location and passes the other locations. As such, the blocking matrix 502 blocks audio signals from the speaking occupant position. The blocking matrix 502 generates a plurality of blocking matrix output signals, each of which corresponds to one of the audio signals provided by the microphones 112.

The processor 114 of the exemplary embodiments is further configured to apply an adaptive noise canceller 504, for instance, a generalized sidelobe canceller, as is appreciated by those skilled in the art. The processor 114 of the exemplary embodiment is configured to sum the beamformer output signal and the adaptive noise cancellation output signal to generate a speaking occupant output signal.

The speaking occupant output signal represents the speech performed by the speaking occupant. The speaking occupant output signal may then be transmitted to the speech recognition system 104. The adaptive noise canceller 504 minimizes the variance of the speaking occupant output signal of the processor 114.

As stated previously, the microprocessor 212 may be utilized to identify motion of the mouth of the occupant. Accurate detection of speech presence enables accurate calculation of the relative transfer functions between microphone signals, and therefore more accurate components produced by the beamformer 500 and the blocking matrix 502. The relative transfer functions can be computed by correlating the microphone signals when the user is speaking. Robust speech detection by the position sensor for improved beamforming can be implemented with the previously described embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An adaptive beamforming method for receiving desired sounds, said method comprising:
   determining an occupant position of an occupant engaging in speech within a defined space in a vehicle, said determining comprising
      transmitting waves in an ultrasonic range and/or a radio frequency (RF) range with a plurality of transmitters,
      receiving reflected waves, and
      analyzing signals corresponding to the transmitted and reflected waves to determine the occupant position;
   determining when the occupant is engaging in speech by identifying motion of a mouth of the occupant engaging in speech by using a sensor in the vehicle and searching for distinguishing features in spatio-temporal and/or velocity features of signals corresponding to the reflected waves, and generating speech detection based on the determination, the speech detection including detection of when the occupant is speaking based on the detected motion of the mouth of the occupant;
   receiving sound from within the defined space with a plurality of microphones;
   generating a plurality of audio signals corresponding to the received sound at each of said plurality of microphones;
   applying a beamformer to the audio signals to direct a microphone beam toward the determined occupant position and generate a beamformer output signal, wherein:
      the applying of the beamformer comprises modifying the beamformer based simultaneously on both the determined occupant position and the speech detection, including the detection of when the occupant is speaking based on the detected motion of the mouth of the occupant; and
      the applying of the beamformer comprises applying a sidelobe canceller to the audio signals to direct a microphone beam toward the determined occupant position and generate a beamformer output signal, by modifying the sidelobe canceller based on both the determined occupant position and the speech detection, including the detection of when the occupant is speaking based on the detected motion of the mouth of the occupant; and
   applying a blocking matrix to the audio signals via the sidelobe canceller, and generating a plurality of blocking matrix output signals, each of which corresponds to one of the audio signals.

2. A method as set forth in claim 1 further comprising:
   applying an adaptive noise cancellation process to the blocking matrix output signals to generate an adaptive noise cancellation output signal; and
   summing the beamformer output signal and the adaptive noise cancellation output signal to generate a speaking occupant output signal.

3. A system for receiving desired sounds, said system comprising:
   a position sensor configured to determine an occupant position of an occupant engaging in speech within a defined space and transmit the speaking occupant position, said position sensor comprising:
      a signal generator,
      a plurality of transmitters electrically coupled to said signal generator and configured to generate waves in an ultrasonic range and/or an RF range,
      a plurality of receivers configured to receive reflected waves and generate a plurality of received signals corresponding to the received reflected waves, and
      a processing unit electrically coupled to said receivers and configured to receive the received signals, determine the occupant position, and identify motion of a mouth of the occupant engaging in speech by searching for distinguishing features in spatio-temporal and/or velocity features of signals corresponding to the reflected waves, and generating speech detection based on the determination, the speech detection including detection of when the occupant is speaking based on the detected motion of the mouth of the occupant;
   a plurality of microphones configured to receive sound from within the defined space and transmit audio signals corresponding to the received sound; and
   a processor in communication with said position sensor and said microphones and configured to receive the speaking occupant position and the audio signals, apply a beamformer to the audio signals to direct a microphone beam toward the determined occupant position, and generate a beamformer output signal, wherein the processor is configured to apply the beamformer by modifying the beamformer based simultaneously on both the determined occupant position and the speech detection, including the detection of when the occupant is speaking based on the detected motion of the mouth of the occupant.

4. A system as set forth in claim 3 wherein said processor is also configured to apply a blocking matrix to each of the audio signals to exclude other positions not associated with the occupant engaging in speech to generate a plurality of blocking matrix output signals corresponding to each of the audio signals, apply an adaptive noise cancellation process to the blocking matrix output signals to generate an adaptive noise cancellation output signal, and sum the beamformer output signal and the adaptive noise cancellation output signal to generate a speaking occupant output signal.

5. A system as set forth in claim 3 wherein said position sensor comprises a camera.

6. A vehicle comprising:
a passenger compartment;
an audio system comprising
a position sensor configured to determine an occupant position of an occupant engaging in speech within the passenger compartment and transmit the speaking occupant position, said position sensor comprising
a signal generator,
a plurality of transmitters electrically coupled to said signal generator and configured to generate waves in an ultrasonic range and/or an RF range,
a plurality of receivers configured to receive reflected waves and generate a plurality of received signals corresponding to the received reflected waves, and
a processing unit electrically coupled to said receivers and configured to receive the received signals, determine the occupant position, and identify motion of a mouth of the occupant engaging in speech by searching for distinguishing features in spatio-temporal and/or velocity features of signals corresponding to the reflected waves, and generating speech detection based on the determination, the speech detection including detection of when the occupant is speaking based on the detected motion of the mouth of the occupant;
a plurality of microphones configured to receive sound from within the defined space and transmit audio signals corresponding to the received sound; and
a processor in communication with said position sensor and said microphones and configured to receive the speaking occupant position and the audio signals, apply a beamformer to the audio signals to direct a microphone beam toward the occupant position, and generate a beamformer output signal, apply a blocking matrix to each of the audio signals to exclude other positions not associated with the occupant engaging in speech to generate a plurality of blocking matrix output signals corresponding to each of the audio signals, apply an adaptive noise cancellation process to the blocking matrix output signals to generate an adaptive noise cancellation output signal, and sum the beamformer output signal and the adaptive noise cancellation output signal to generate a speaking occupant output signal, wherein the processor is configured to apply the beamformer by modifying the beamformer based simultaneously on both the determined occupant position and the speech detection, including the detection of when the occupant is speaking based on the detected motion of the mouth of the occupant; and
at least one of a speech recognition system and a telephony system in communication with said audio system for receiving said speaking occupant output signal.

7. A vehicle as set forth in claim 6 wherein said plurality of transmitters comprise a plurality of ultrasonic transmitters electrically coupled to said signal generator and configured to generate sound waves in the ultrasonic range.

8. A vehicle as set forth in claim 6 wherein said plurality of transmitters comprise a plurality of RF transmitters electrically coupled to said signal generator for generating RF waves in the RF range.

9. The system of claim 3, wherein the processor is configured to:
apply a sidelobe canceller to the audio signals to direct a microphone beam toward the determined occupant position and generate a beamformer output signal, by modifying the sidelobe canceller based on both the determined occupant position and the speech detection; and
apply a blocking matrix to the audio signals via the sidelobe canceller, and generate a plurality of blocking matrix output signals, each of which corresponds to one of the audio signals.

10. The method of claim 1, further comprising:
summing the adaptive noise cancellation output signal with a beamformer output signal from the application of the beamformer to the audio signals, to generate a speaking output signal for a speech recognition system using the output of the beamformer.

11. The vehicle of claim 6, wherein the processor is configured to:
apply a sidelobe canceller to the audio signals to direct a microphone beam toward the determined occupant position and generate a beamformer output signal, by modifying the sidelobe canceller based on both the determined position and the speech detection; and
apply a blocking matrix to the audio signals via the sidelobe canceller, and generate a plurality of blocking matrix output signals, each of which corresponds to one of the audio signals.

12. The system of claim 3, wherein the position sensor is disposed within a vehicle, and the position sensor is configured to determine an occupant position of an occupant in a passenger compartment of a vehicle engaging in speech within a defined space in the passenger compartment of the vehicle.

13. The method of claim 1, wherein the beamformer changes the direction of the microphone beam as the mouth of the occupant moves, as detected via the speech detection.

14. The system of claim 3, wherein the beamformer changes the direction of the microphone beam as the mouth of the occupant moves, as detected via the speech detection.

15. The vehicle of claim 6, wherein the beamformer changes the direction of the microphone beam as the mouth of the occupant moves, as detected via the speech detection.

16. The method of claim 1, wherein the beamformer changes the direction of the microphone beam as the lips of the occupant moves, as detected via the speech detection.

* * * * *